United States Patent
Miranda et al.

(10) Patent No.: US 9,938,899 B2
(45) Date of Patent: Apr. 10, 2018

(54) HOT GAS PATH COMPONENT HAVING CAST-IN FEATURES FOR NEAR WALL COOLING

(71) Applicant: General Electric Company, Schenectady, NY (US)

(72) Inventors: Carlos Miguel Miranda, Greer, SC (US); Srikanth Chandrudu Kottilingam, Simpsonville, SC (US); Benjamin Paul Lacy, Greer, SC (US)

(73) Assignee: General Electric Company, Schenectady, NY (US)

(*) Notice: Subject to any disclaimer, the term of this patent is extended or adjusted under 35 U.S.C. 154(b) by 226 days.

(21) Appl. No.: 14/739,791

(22) Filed: Jun. 15, 2015

(65) Prior Publication Data

US 2016/0363053 A1 Dec. 15, 2016

(51) Int. Cl.
*F01D 5/18* (2006.01)
*F02C 7/18* (2006.01)

(52) U.S. Cl.
CPC ............... *F02C 7/18* (2013.01); *F01D 5/186* (2013.01); *F01D 5/187* (2013.01); *F05D 2230/21* (2013.01); *F05D 2260/202* (2013.01); *Y02T 50/672* (2013.01); *Y02T 50/676* (2013.01)

(58) Field of Classification Search
CPC ...... F01D 5/186; F01D 5/187; F05D 2230/21; F05D 2240/81; F05D 2260/202; Y02T 50/676
USPC .................................................. 415/115, 116
See application file for complete search history.

(56) References Cited

U.S. PATENT DOCUMENTS

| | | |
|---|---|---|
| 4,142,824 A | 3/1979 | Andersen |
| 4,270,883 A | 6/1981 | Corrigan |
| 4,526,512 A | 7/1985 | Hook |
| 5,062,768 A | 11/1991 | Marriage |
| 5,263,820 A | 11/1993 | Tubbs |
| 5,640,767 A | 6/1997 | Jackson et al. |
| 5,660,524 A | 8/1997 | Lee et al. |
| 6,383,602 B1 | 5/2002 | Fric et al. |
| 6,896,036 B2 | 5/2005 | Schneiders et al. |

(Continued)

FOREIGN PATENT DOCUMENTS

| | | |
|---|---|---|
| EP | 0 227 580 A2 | 7/1987 |
| EP | 2 381 070 A2 | 10/2011 |

(Continued)

OTHER PUBLICATIONS

Extended European Search Report and Opinion issued in connection with corresponding EP Application No. 16173820.8 dated Nov. 11, 2016.

(Continued)

*Primary Examiner* — Matthew W Jellett
(74) *Attorney, Agent, or Firm* — Armstrong Teasdale LLP (57) ABSTRACT

A hot gas path component includes a substrate having an outer surface and an inner surface. The inner surface of the substrate defines at least one interior space. At least a portion of the outer surface of the substrate includes a recess formed therein. The recess includes a bottom surface and a groove extending at least partially along the bottom surface of the recess. A cover is disposed within the recess and covers at least a portion of the groove. The groove is configured to channel a cooling fluid therethrough to cool the cover.

20 Claims, 8 Drawing Sheets

(56) References Cited

U.S. PATENT DOCUMENTS

| | | | |
|---|---|---|---|
| 6,921,014 B2 * | 7/2005 | Hasz | C23C 26/02 228/122.1 |
| 6,942,449 B2 | 9/2005 | Boyer | |
| 7,364,405 B2 | 4/2008 | Cunha et al. | |
| 7,549,844 B2 | 6/2009 | Liang | |
| 7,621,718 B1 * | 11/2009 | Liang | F01D 5/186 415/115 |
| 8,070,436 B2 | 12/2011 | Mitchell | |
| 8,070,441 B1 | 12/2011 | Liang | |
| 8,167,559 B2 | 5/2012 | Liang | |
| 8,176,720 B2 | 5/2012 | Beeck | |
| 8,317,475 B1 | 11/2012 | Downs | |
| 8,414,263 B1 | 4/2013 | Liang | |
| 8,491,264 B1 | 7/2013 | Liang | |
| 8,561,411 B2 | 10/2013 | DiBenedetto | |
| 8,578,720 B2 | 11/2013 | Ebert et al. | |
| 8,651,805 B2 | 2/2014 | Lacy et al. | |
| 8,807,943 B1 | 8/2014 | Liang | |
| 9,206,696 B2 | 12/2015 | Bunker et al. | |
| 9,435,208 B2 | 9/2016 | Bunker | |
| 9,458,725 B2 | 10/2016 | Morgan et al. | |
| 9,476,306 B2 | 10/2016 | Bunker | |
| 2010/0183428 A1 | 7/2010 | Liang | |
| 2011/0110771 A1 | 5/2011 | Morgan et al. | |
| 2011/0259017 A1 | 10/2011 | Lacy et al. | |
| 2012/0111545 A1 | 5/2012 | Bunker et al. | |
| 2012/0124832 A1 | 5/2012 | Bunker et al. | |
| 2012/0255870 A1 | 10/2012 | Rebak et al. | |
| 2012/0276308 A1 | 11/2012 | Rebak et al. | |
| 2012/0328451 A1 | 12/2012 | Lomas et al. | |
| 2013/0086784 A1 | 4/2013 | Bunker | |
| 2013/0101761 A1 | 4/2013 | Bunker et al. | |
| 2014/0004310 A1 * | 1/2014 | Rebak | F01D 5/184 428/166 |
| 2014/0110559 A1 | 4/2014 | Lee et al. | |
| 2015/0086408 A1 | 3/2015 | Kottilingam et al. | |
| 2015/0096305 A1 | 4/2015 | Morgan et al. | |
| 2015/0251280 A1 | 9/2015 | Bunker | |
| 2016/0339544 A1 | 11/2016 | Xu et al. | |

FOREIGN PATENT DOCUMENTS

| | | |
|---|---|---|
| EP | 2 518 270 A2 | 10/2012 |
| EP | 2 540 971 A1 | 1/2013 |
| EP | 2 853 323 A2 | 4/2015 |
| GB | 803 650 A | 10/1958 |
| GB | 2 260 166 A | 4/1993 |
| WO | 2015/035363 A1 | 3/2015 |

OTHER PUBLICATIONS

Extended European Search Report and Opinion issued in connection with related EP Application No. 16174145.9 dated Nov. 14, 2016.

Extended European Search Report and Opinion issued in connection with related EP Application No. 16174266.3 dated Nov. 18, 2016.

Extended European Search Report and Opinion issued in connection with related EP Application No. 16174149.1 dated Dec. 6, 2016.

U.S. Appl. No. 14/739,727, filed Jun. 15, 2015, Miranda, et al.
U.S. Appl. No. 14/739,849, filed Jun. 15, 2015, Miranda, et al.
U.S. Appl. No. 14/739,944, filed Jun. 15, 2015, Lacy, et al.

* cited by examiner

HOT GAS PATH COMPONENT HAVING CAST-IN FEATURES FOR NEAR WALL COOLING

FEDERAL RESEARCH STATEMENT

The subject matter of this disclosure was made with Government support under Contract No. DE-FC26-05NT42643, awarded by the Department of Energy (DOE), and the Government has certain rights in the subject matter claimed herein.

BACKGROUND

The field of the present disclosure relates generally to turbine engines, and more particularly to hot gas path components having cast-in features for near wall cooling.

Gas turbine systems are widely utilized in fields such as power generation. A conventional gas turbine system includes a compressor, a combustor, and a turbine. During operation of the gas turbine system, various components in the system are subjected to high temperature flows, which can cause the components to fail. Since higher temperature flows generally result in increased performance, efficiency, and power output of the gas turbine system and are thus desired in a gas turbine system, the components that are subjected to high temperature flows must be cooled to allow the gas turbine system to operate with flows at increased temperatures.

Various strategies are known in the art for cooling components that are subjected to high temperature flows. These components are typically known as hot gas path components. For example, a series of internal cooling passages may be formed in a hot gas path component to facilitate near wall cooling. A cooling fluid may be provided to the passages from a plenum, and the cooling fluid may flow through the passages, cooling the hot gas path component substrate and coatings. However, the smaller near-wall cavities, or micro-channels, present a considerable fabrication challenge for cores and castings, which can significantly increase the manufacturing cost of the hot gas path components using such known near wall cooling systems.

BRIEF DESCRIPTION

In one aspect, a hot gas path component is provided. The hot gas path component includes a substrate having an outer surface and an inner surface. The inner surface defines at least one interior space. At least a portion of the outer surface has a recess formed therein. The recess includes a bottom surface and a groove extending at least partially along the bottom surface of the recess. The hot gas path component also includes a cover disposed within the recess. The cover covers at least a portion of the groove. The groove is configured to channel a cooling fluid therethrough to cool the cover.

In another aspect, a hot gas path component is provided. The hot gas path component includes a unitary substrate having a first platform, an airfoil, an opposing second platform integrally joined longitudinally together, and at least one cast in fillet formed at an intersection between the airfoil and at least one of the first platform and the second platform. The hot gas path component also includes a groove formed in the substrate. Moreover, the hot gas path component includes a cover disposed over at least a portion of the groove. The groove is configured to channel a cooling fluid therethrough to cool the cover.

In yet another aspect, a gas turbine engine is provided. The gas turbine engine includes a compressor, a turbine coupled to the compressor, and a hot gas path component disposed in a least one of the compressor and the turbine. The hot gas path component includes a substrate having an outer surface and an inner surface. The inner surface defines at least one interior space. At least a portion of the outer surface has at least one datum integrally formed therein. The hot gas path component also includes a groove formed in the substrate. A cover is disposed over at least a portion of the groove. The groove is configured to channel a cooling fluid therethrough to cool the cover.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings. The singular forms "a", "an", and "the" include plural references unless the context clearly dictates otherwise. Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

Figure 1:
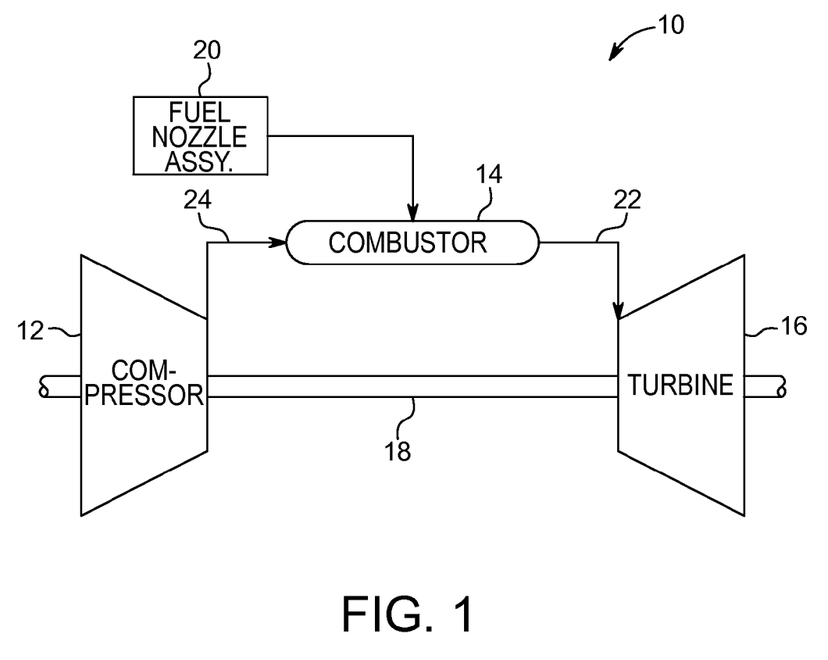
FIG. 1 is a schematic view of an exemplary gas turbine engine.

FIG. 1 is a schematic view of a rotary machine, i.e., a turbomachine, and more specifically, a turbine engine. In the exemplary embodiment, the turbine engine is a gas turbine engine 10. Alternatively, the rotary machine is any other turbine engine and/or rotary machine, including, without limitation, a steam turbine engine, a centrifugal compressor, and a turbocharger. In the exemplary embodiment, gas turbine engine 10 includes at least one of each of a compressor 12, a combustor 14, a turbine 16, and a fuel nozzle 20. Fuel nozzle 20 is configured to inject and mix fuel (not shown) with pressurized air 24 in combustor 14. Combustor 14 ignites and combusts the fuel-air mixture (not shown) and then passes a hot gas flow 22 into turbine 16. Turbine 16 includes one or more stators having fixed vanes or blades (not shown in FIG. 1), and one or more rotors having blades or buckets (not shown in FIG. 1) that rotate relative to the stators. Hot gas flow 22 passes over the turbine rotor blades, thereby driving the turbine rotor to rotate. Turbine 16 is coupled to a single rotatable shaft 18 such that it rotates the shaft as hot gas flow 22 passes over the turbine blades. In alternative embodiments, rotatable shaft 18 is a plurality of shaft segments coupled together to form rotatable shaft 18. In the exemplary embodiment, rotatable shaft 18 is coupled to compressor 12. Compressor 12 includes blades (not shown) rigidly mounted to a rotor (not shown) that is driven to rotate by rotatable shaft 18. As air passes over the rotating blades, air pressure increases, thereby providing combustor 14 with sufficient pressurized air 24 for proper combustion.

Figure 2:
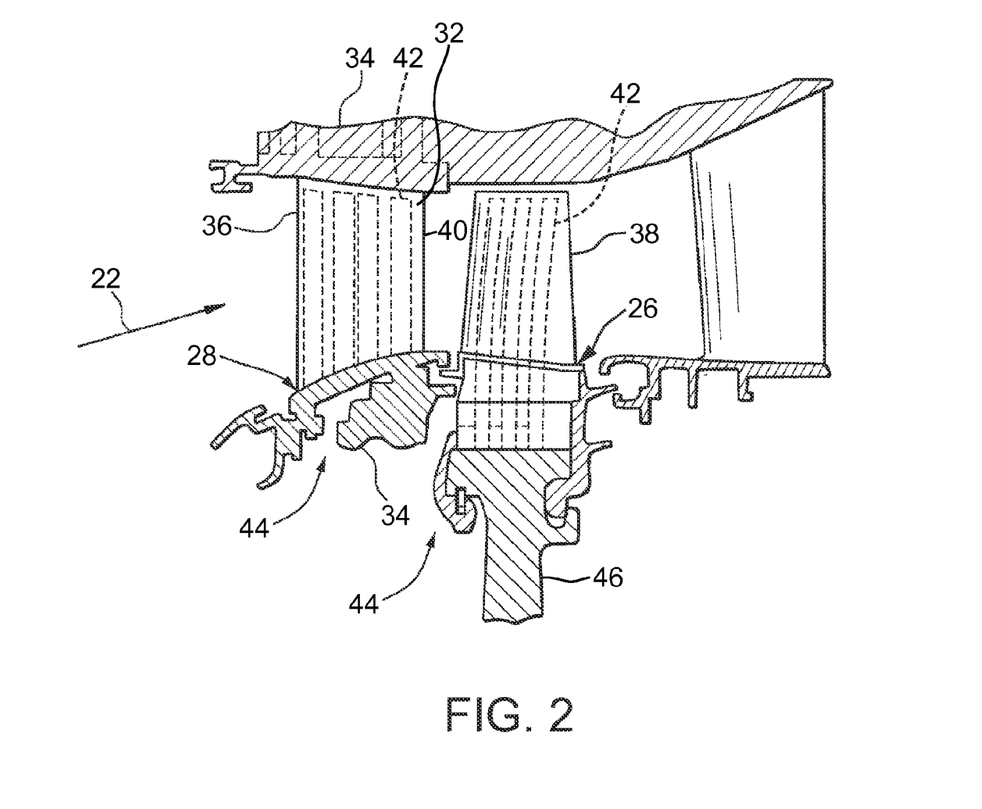
FIG. 2 is a schematic view of a portion of a turbine of the gas turbine engine shown in FIG. 1.

FIG. 2 is a schematic view of a portion of turbine 16 of gas turbine engine 10 shown in FIG. 1. In the exemplary embodiment, turbine 16 includes a turbine blade 26 and a stator vane or hot gas path component 28. An airfoil 32 used with the stator vane or hot gas path component 28 includes a leading edge 36 that is directly exposed to hot gas flow 22. In addition, airfoil 32 includes a trailing edge 40 axially opposite leading edge 36. Stator vanes 28 may be cooled by air routed from one or more stages of compressor 12 through a casing 34 of gas turbine engine 10. An airfoil 38 used with turbine blade 26 is also directly exposed to hot gas flow 22. Turbine blade 26 may also be cooled by pressurized air 24 routed from one or more stages of compressor 12 through casing 34 of gas turbine engine 10.

While a stator vane is described herein, a hot gas path component is any component of gas turbine engine 10 that is at least partially exposed to hot gas flow 22 through gas turbine engine 10, e.g., where the operating temperature, in one example, is above 2500 degrees Fahrenheit (° F.) (~1371 degrees Celsius (° C.)). For example, hot gas path component 28 includes, without limitation, bucket assemblies (also known as blades or blade assemblies), nozzle assemblies (also known as vanes or vane assemblies), shroud assemblies, transition pieces, retaining rings, and compressor exhaust components. Hot gas path component 28 is not limited to the examples described above, but is any component that is at least partially exposed to hot gas flow 22. In addition, hot gas path component 28 is not limited to components of gas turbine engine 10, but may be any type of component that is exposed to high temperature flows. It should be understood that the description and figures that utilize a turbine, an airfoil, and a micro-channel are exemplary only. Additionally, it should be understood that the micro-channels described herein may be used in any suitable component through which a cooling fluid such as, water, steam, air, fuel and/or any other suitable fluid is directed for cooling the component and/or for maintaining a temperature of the component.

In the exemplary embodiment, pressurized air 24 is described as the cooling fluid used to cool the components exposed to hot gas flow 22, e.g., turbine blade 26 and hot gas path component 28. In alternative embodiments, a fluid other than pressurized air 24 may be used to cool components exposed to hot gas flow 22. It should also be appreciated that the term "fluid" as used herein includes any medium or material that flows, including, but not limited to gas, steam, and air. In the exemplary embodiment, at least one cooling system 42 is defined in hot gas path component 28 and is coupled in flow communication with a cooling fluid supply conduit 44 formed in casing 34. In the exemplary embodiment, cooling fluid supply conduit 44 is fluidly connected to compressor 12.

In operation, gas turbine engine 10 ingests air into compressor 12. Compressor 12, rotating at a high rotational speed compresses or pressurizes the air and channels a portion of pressurized air 24 to combustor 14 and a portion of pressurized air 24 to other areas of gas turbine engine 10 for use in cooling components exposed to heat generated by gas turbine engine 10. Pressurized air 24 is mixed with fuel in combustor 14 and ignited to generate hot gas flow 22. Hot gas flow 22 is channeled from combustor 14 toward turbine 16 where hot gas flow 22 passes over hot gas path component 28 and impacts turbine blade 26 connected to a rotor wheel 46. Rotor wheel 46 is rotated by hot gas flow 22 impacting turbine blade 26. Hot gas flow 22 also transfers heat to hot gas path component 28 and turbine blade 26. A portion of pressurized air 24 is channeled through cooling system 42 formed in at least hot gas path component 28 to facilitate cooling the component.

Figure 3:
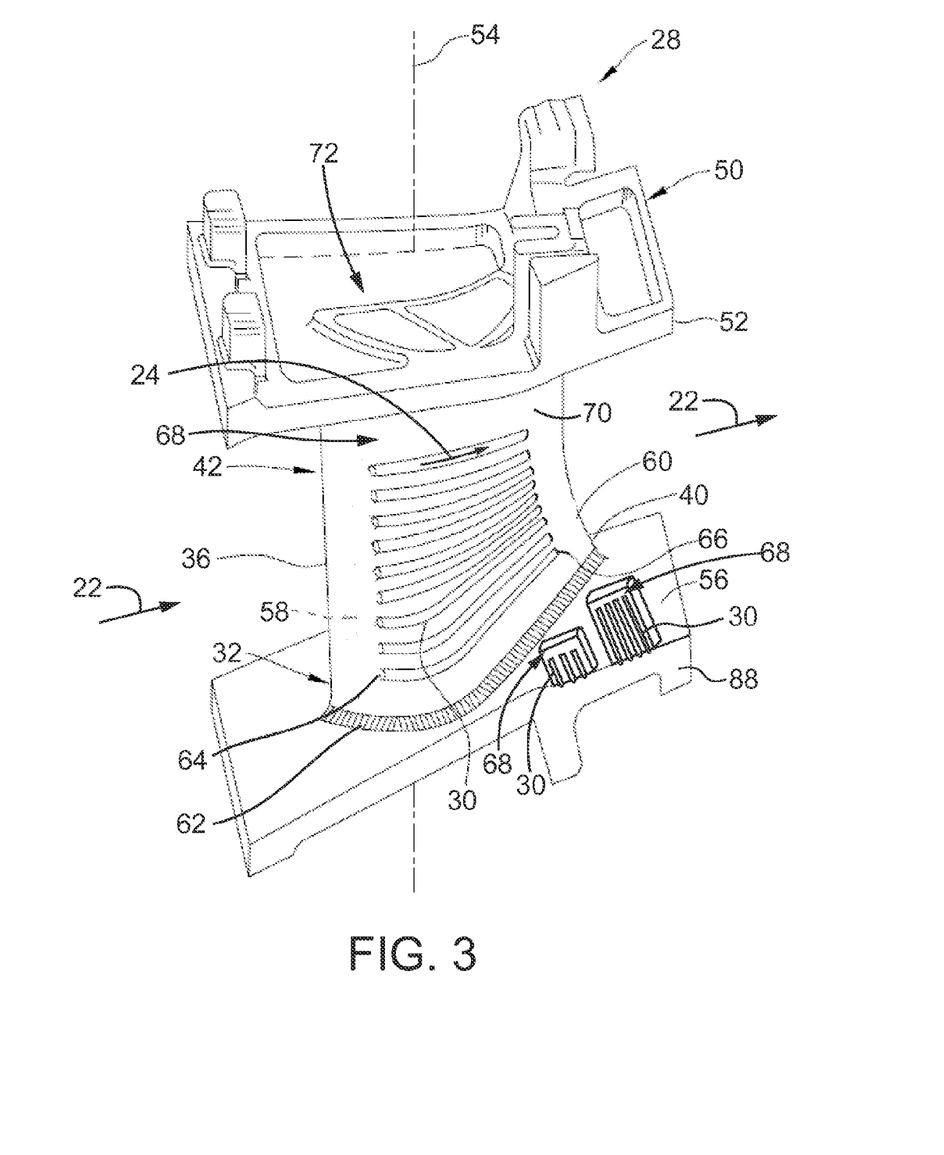
FIG. 3 is a perspective view of a hot gas path component of the turbine shown in FIG. 2, illustrating a plurality of micro-channels formed in an airfoil.
Figure 4:
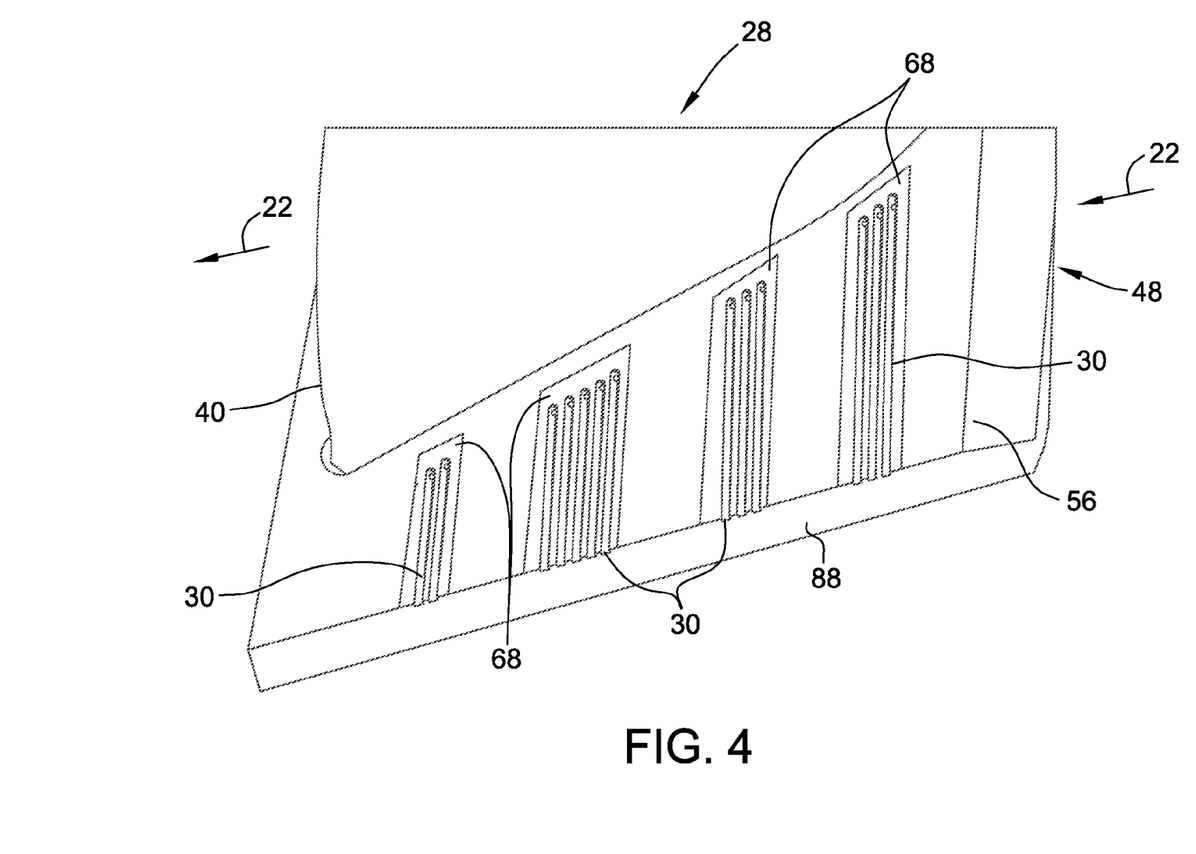
FIG. 4 is a partial cut-away view of the hot gas path component shown in FIG. 3, illustrating the plurality of micro channels formed in a base of the hot gas path component.

FIG. 3 is a perspective view of hot gas path component 28 shown in FIG. 2, illustrating a plurality of micro-channels 30 formed in airfoil 32. FIG. 4 is a partial cut-away view of hot gas path component 28 shown in FIG. 3, illustrating the plurality of micro channels 30 formed in a base 48 of component 28. In the exemplary embodiment, hot gas path component 28 includes a hook portion 50 with airfoil 32 extending from a substantially flat first platform 52. Hook portion 50 facilitates securing hot gas path component 28 to gas turbine engine 10 (shown in FIG. 1). First platform 52 forms a radial boundary for hot gas flow 22 flowing through turbine 16 (shown in FIG. 1) of gas turbine engine 10. In the exemplary embodiment, airfoil 32 is at least partially hollow and extends generally along a radial axis 54 from first platform 52 to base 48, which includes a second platform 56 positioned opposite first platform 52 and forming another radial boundary for hot gas flow 22. Airfoil 32 includes a concave pressure side surface 58 and an opposite convex suction side surface 60 that each extend between leading edge 36 and trailing edge 40.

In the exemplary embodiment, hot gas path component 28 includes a cast in fillet 62 at the intersections between airfoil 32 and first and second platforms 52, 56, respectively. Cast in fillets 62 provide mechanical and structural integrity to hot gas path component 28 in the critical transition areas between airfoil 32 and first and second platforms 52, 56.

In the exemplary embodiment, hot gas path component 28 includes cooling system 42 that extends within the partially hollow airfoil 32 to enable pressurized air 24 to be channeled through and/or within airfoil 32. Cooling system 42 includes the plurality of micro-channels 30 that extend from one or more inlet passages 64 to one or more outlet passages 66 of airfoil 32. In the exemplary embodiment, micro-channels 30 extend substantially axially, i.e., generally parallel with hot gas flow 22. Alternatively, micro-channels 30 can extend in any direction that enables cooling system 42 to function as described herein. In the exemplary embodiment, inlet passages 64 may be individually coupled in flow communication to airfoil 32 or may be coupled in flow communication to a common trough or plenum (not shown in FIG. 3). Outlet passages 66 may individually exhaust pressurized air 24 through film cooling holes 86 (not shown in FIG. 3), may be exhausted off end wall edge 88, or may be coupled in flow communication to a common trough or plenum (not shown).

In the exemplary embodiment, hot gas path component 28 includes one or more pockets or recesses 68 formed in an outer surface 76 (not shown in FIGS. 3-4) of hot gas path component 28. Micro-channels 30 are formed in a bottom surface 70 of each of recesses 68 and are covered by a cover or braze sheet 80 (not shown in FIGS. 3-4). Recesses 68 are offset from the outer surfaces 76 of hot gas path component 28 a predefined, substantially uniform distance such that bottom surface 70 of recesses 68 is a uniform depth relative to and conforming to the outer surface 76 contour of hot gas path component 28. For example, without limitation, a recess 68 formed in convex suction side surface 60 of airfoil 32 conforms to the airfoil surface shape and is offset a predefined distance substantially equal to a thickness of braze sheet 80. Thus, the original airfoil shape and surface location is established by the application of braze sheet 80 to recess 68. It is contemplated that a recess 68 can extend across any portion of outer surface 76 as described herein. For example, without limitation, a recess 68 can be formed in hot gas path component 28 and extend across airfoil 32, cast in fillet 62, and one of platforms 52, 56. Alternatively, recess 68 may be formed in only one portion of hot gas path component 28.

In the exemplary embodiment, hot gas path components 28 can be securely coupled to casing 34 (shown in FIG. 2). When assembled, hot gas path components 28 form an array of vanes that extend circumferentially about a hot gas flow path of turbine 16. Alternatively, when hot gas path component 28 is a turbine blade, hot gas path components 28 form an array of vanes that extend circumferentially about rotor wheel 46.

In the exemplary embodiment, hot gas path component 28 may be fabricated unitarily, for example, by casting of a suitable superalloy capable of withstanding the temperatures and stresses generated within turbine 16. As described herein, airfoil 32 is a least partially hollow and includes internal cooling system 42. Hot gas path component 28 includes a plurality of inlet apertures 72 that extend longitudinally through hot gas path component 28 and are coupled in flow communication with cooling system 42 formed in airfoil 32. Pressurized air 24 bled from compressor 12 is channeled through cooling fluid supply conduit 44 and into inlet apertures 72 to provide pressured air 24 to airfoil 32.

Figure 5:
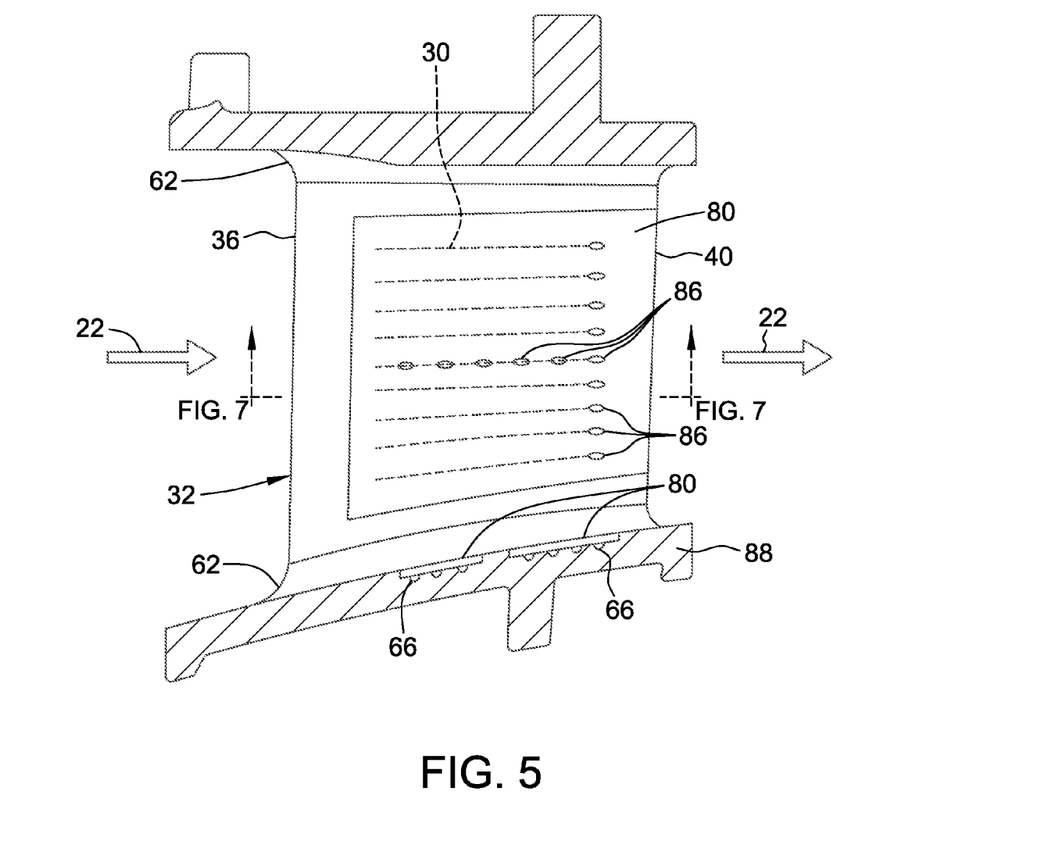
FIG. 5 is a schematic end view of the hot gas path component shown in FIG. 3 for use in the gas turbine engine of FIG. 1, including a cooling system formed therein.
Figure 6:
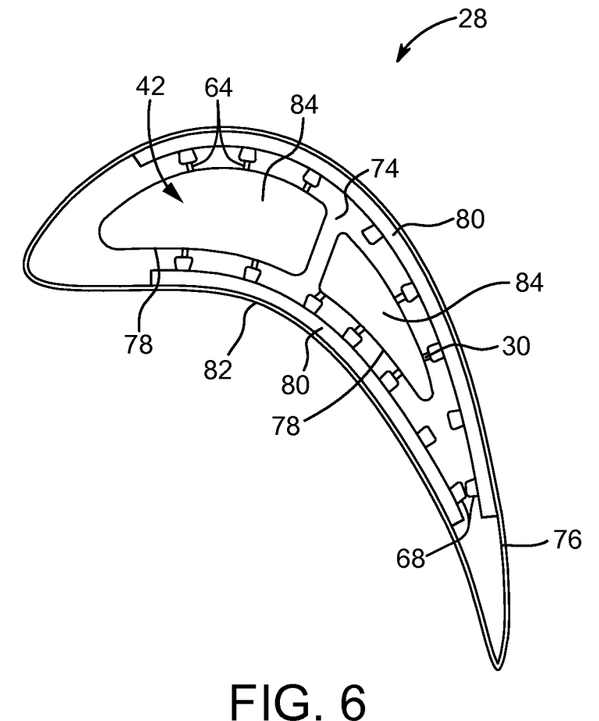
FIG. 6 is a schematic cross-section of the hot gas path component 28 of FIG. 5, including the cooling system.
Figure 7:
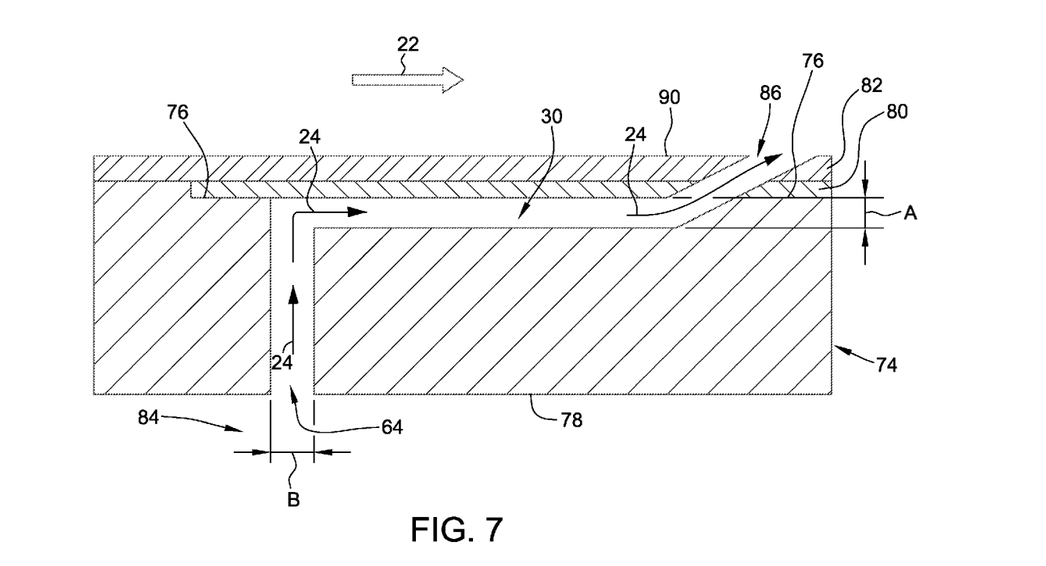
FIG. 7 is a schematic cross-section of one of the micro-channels shown in FIG. 5, illustrating the micro-channel channeling pressurized air from an inlet passage to a film cooling hole.

FIG. 5 is a schematic end view of hot gas path component 28 shown in FIG. 3 for use in gas turbine engine 10 of FIG. 1, and including cooling system 42 formed therein. FIG. 6 is a schematic cross-section of hot gas path component 28 of FIG. 5 including cooling system 42 formed therein. FIG. 7 is a schematic cross-section of one of micro-channels 30 shown in FIG. 5, illustrating micro-channel 30 channeling pressurized air 24 from inlet passage 64 to film cooling hole 86. When hot gas path component 28 is exposed to a hot gas flow 22, hot gas path component 28 is heated by hot gas flow 22 and can reach a temperature at which hot gas path component 28 may rapidly deteriorate. Cooling system 42 for hot gas path component 28 enables gas turbine engine 10 to function with hot gas flow 22 at an increased temperature, which increases the efficiency and performance of gas turbine engine 10.

In the exemplary embodiment, as described herein, cooling system 42 includes a series of small grooves, or micro-channels 30, formed in a substrate 74 of hot gas path component 28. As used herein, "small" or "micro" channel dimensions range between approximately 0.010 inches (in.) (0.25 millimeters (mm)) and approximately 0.100 in. (2.54 mm). Substrate 74 includes an outer surface 76 and an inner surface 78. In addition, substrate 74 includes one or more recesses 68 formed in outer surface 76. In the exemplary embodiment, micro-channels 30 are formed in recesses 68 of substrate 74. In some embodiments, micro-channels 30 are at least partially formed during the casting of hot gas path component 28.

In the exemplary embodiment, hot gas path component 28 is formed by a casting process such as, but not limited to, an investment casting process, and is fabricated from any suitable material depending on the intended application for hot gas path component 28. For example, without limitation, hot gas path component 28 can be formed from Ni-base, Co-base, and Fe-base superalloys and the like. Some Ni-base superalloys are known to be advantageous because of a combination of desirable properties including high temperature strength and high temperature creep resistance. The material used to form substrate 74 may also include a NiAl intermetallic alloy, as these alloys are also known to possess a combination of superior properties including high temperature strength and high temperature creep resistance that are advantageous for use in turbine engine applications used for aircraft. In alternative embodiments, substrate 74 is formed from any material that enables substrate 74 to function as described herein.

After casting hot gas path component 28, micro-channels 30 are finished machined into outer surface 76 of substrate 74. One or more inlet passages 64 connecting micro-channels 30 to plenum 84 are drilled using, for example, without limitation, electro-discharge machining (EDM) or any conventional drilling method that enables inlet passages 64 to be formed as described herein.

In the exemplary embodiment, micro-channel 30 is formed in outer surface 76 of substrate 74 by either a casting process or by a casting process and a finish machining process. Inlet passage 64 extends through substrate 74 from outer surface 76 to inner surface 78. In the exemplary embodiment, inlet passage 64 is formed substantially perpendicular to micro-channel 30. Alternatively, inlet passage 64 is formed at an angle, including an acute and or an obtuse angle, to micro-channel 30. For example, in one particular embodiment, inlet passage 64 is formed at an acute angle with respect to micro-channel 30 such that the angle is less than 90°. In the exemplary embodiment, inlet passage 64 intersects micro-channel 30 substantially perpendicularly, coupling micro-channel 30 in fluid communication to plenum 84.

In the exemplary embodiment, micro-channel 30 and inlet passage 64 may be formed using a variety of techniques. For example, without limitation, techniques for forming these features include laser machining, water jet machining, electro-chemical machining (ECM), electro-discharge machining (EDM), photolithography, or any other process capable of providing holes and micro-channels with proper sizes and tolerances. In one particular embodiment, for example, without limitation, inlet passage 64 feeding micro-channel 30 is drilled either as a straight hole of constant cross section, a shaped hole (elliptical etc.), or a converging or diverging hole using an EDM drilling process. Is should be understood that the EDM process can include a multi-axis computer numerically controlled (CNC) unit. CNC units enable movement of the cutting tool along a number of axes, including X, Y, and Z axes, as well as rotational axes.

In the exemplary embodiment, a length of micro-channel 30 is in the range of 10 to 1000 times a diameter of film cooling hole 86, and more particularly, in the range of 20 to 100 times film cooling hole 86 diameter. Micro-channels 30 can be used anywhere on outer surface 76 of hot gas path component 28, including, but not limited to first and second platforms 52, 56, concave pressure side surface 58, convex suction side surface 60, and cast in fillets 62. In addition, micro-channels 30 can have any configuration, for example, straight, curved, or have multiple curves.

Micro-channels 30 have a depth A and a width (not shown) in the range between approximately 0.010 inches (in.) (0.25 millimeters (mm)) and approximately 0.100 in. (2.54 mm). Alternatively, micro-channels 30 can have any depth and width that enables micro-channels 30 to function as described herein. In the exemplary embodiment, micro-channels 30 are semicircular and depth A is representative of a radius dimension. In alternative embodiments, micro-channels 30 can have any cross-sectional shape that enables micro-channels 30 to function as described herein, for example, without limitation, square, rectangular, triangular, and semioval shapes. It is contemplated that various micro-channels 30 have cross-sections with a certain geometric shape, while other micro-channels 30 have cross-sections with another geometric shape.

In the exemplary embodiment, micro-channel 30 can be generally straight, or can be generally curved, sinusoidal, or serpentine. Micro-channel 30 can be oriented such that pressurized air 24 flows through micro-channel 30 in any direction with respect to hot gas flow 22. For example, without limitation, pressurized air 24 can flow through micro-channel 30 or any portion thereof in a generally downstream direction with respect to hot gas flow 22, or in a generally upstream direction with respect to hot gas flow 22, or in any other direction with respect to the hot gas flow 22. In some embodiments, micro-channel 30 may be a singular, discrete micro-channel. In other embodiments, micro-channel 30, or any portion of micro-channel 30, may branch off from micro-channel 30 to form multiple micro-channel branches. It is contemplated that micro-channel 30, in some embodiments, wraps around the entire perimeter of hot gas path component 28, or wraps around only portions of the perimeter of hot gas path component 28. However, it is understood that each of micro-channels 30 generally do not intersect with any other micro-channel 30.

In the exemplary embodiment, inlet passage 64 has a cross-sectional width B. In one embodiment, cross-sectional width B and depth A are substantially the same dimension. In alternative embodiments, cross-sectional width B is larger than depth A of micro-channel 30. In the exemplary embodiment, cross-sectional width B is in the range between approximately 0.010 inches (in.) (0.25 millimeters (mm)) and approximately 0.100 in. (2.54 mm). In the exemplary embodiment, inlet passage 64 is circular and width B is representative of a diameter dimension. In alternative embodiments, inlet passage 64 can have any cross-sectional shape that enables inlet passage 64 to function as described herein, for example, without limitation, square, rectangular, triangular, and semioval shapes. It is contemplated that various inlet passages 64 have cross-sections with a certain geometric shape, while other inlet passages 64 have cross-sections with another geometric shape.

In the exemplary embodiment, one or more covers or braze sheets 80, configured to cover at least a portion of micro-channels 30, are coupled to substrate 74 within each of recesses 68. Braze sheets 80 conform to the profile of outer surface 76 and cover micro-channels 30, thereby forming a plurality of cooling passages.

Hot gas path component 28 includes a coating 82 formed over at least a portion of outer surface 76 and braze sheets 80, forming a protective material layer on hot gas path component 28. Coating 82 may include one or more material layers, such as a bondcoat and a TBC. In the exemplary embodiment, coating 82 is a thermal barrier coating (TBC). For example, coating 82 may be yttria-stabilized zirconia and may be applied to hot gas path component 28 through a physical vapor deposition process or thermal spray process as described herein. Alternatively, coating 82 may be a ceramic, for example, without limitation, a thin layer of zirconia modified by other refractory oxides such as oxides formed from Group IV, V and VI elements or oxides modified by Lanthanide series elements such as La, Nd, Gd, Yb, and the like. For particular configurations, coating 82 has a thickness in the range of 0.1 to 2.0 millimeters, and more particularly, in the range of 0.1 to 1 millimeter, and still more particularly 0.1 to 0.5 millimeters for industrial gas turbine components. However, other thicknesses may be utilized depending on the requirements for a particular hot gas path component 28. In alternative embodiments, hot gas path component 28 can be formed from a high temperature ceramic matrix composite (CMC) and coating 82 can include an environmental barrier coating (EBC) system that includes one or more material layers.

Coating 82 in deposited onto hot gas path component 28 using a variety of techniques. In one embodiment, coating 82 is disposed over at least a portion of outer surface 76 of substrate 74 by performing an ion plasma deposition. Briefly, ion plasma deposition includes placing a cathode formed of a coating material into a vacuum environment within a vacuum chamber, providing substrate 74 within the vacuum environment, supplying a current to the cathode to form a cathodic arc upon a cathode surface resulting in erosion or evaporation of coating material from the cathode surface, and depositing the coating material from the cathode upon the substrate outer surface 76. In one embodiment, the ion plasma deposition process includes a plasma vapor deposition process. Non-limiting examples of coating 82 include structural coatings, bond coatings, oxidation-resistant coatings, and thermal barrier coatings. In alternative embodiments, coating 82 is disposed over at least a portion of outer surface 76 of substrate 74 by performing a thermal spray process. For example, without limitation, the thermal spray process includes combustion spraying and/or plasma spraying. The combustion spraying process includes high velocity oxygen fuel spraying (HVOF) or high velocity air fuel spraying (HVAF). The plasma spraying process includes atmospheric (such as air or inert gas) plasma spray or low pressure plasma spray (LPPS), which is also known as vacuum plasma spray (VPS). Alternatively, techniques for depositing one or more layers of coating 82 include, without limitation, sputtering, electron beam physical vapor deposition, electroless plating, electroplating, and any other process that enables coating 82 to function as described herein.

In operation, pressurized air 24 flows through cooling system 42, and in particular, plenum 84, at a pressure generally higher than a pressure in inlet passage 64 and micro-channel 30. The pressure differential causes a portion of pressurized air 24 contained within cooling system 42 to flow into and through inlet passage 64, and from inlet passage 64 into and through micro-channel 30. Inlet passage 64 is configured to provide convection cooling to coating 82. For example, without limitation, inlet passage 64 is oriented generally perpendicular to braze sheet 80, which enables pressurized air 24 to impact on braze sheet 80 with a relatively high velocity, thus increasing the cooling effectiveness of pressurized air 24. As pressurized air 24 flows through inlet passage 64 and is provided to micro-channel 30, pressurized air 24 impacts on braze sheet 80, providing convection cooling of coating 82. After pressurized air 24 flows through micro-channel 30, cooling coating 82 and outer surface 76 of substrate 74, pressurized air 24 may be exhausted from micro-channels 30 through film cooling holes 86. For example, without limitation, in one embodiment as shown in FIGS. 5-6, pressurized air 24 may be exhausted adjacent an outer surface 90 (shown in FIG. 7) of coating 82. In one particular embodiment, as shown with respect to one micro-channel 30 in FIG. 5, more than one film cooling holes 86 is spaced apart along a length of micro-channel 30 thus forming a trench exit micro-channel 30. Alternatively, pressurized air 24 may be exhausted off end wall edge 88 (shown in FIGS. 3-5) of hot gas path component 28. In other embodiments, pressurized air 24 may be exhausted off of trailing edge 40 or leading edge 38 of airfoil 32 and into the path of hot gas flow 22. It should be noted that although film cooling holes 86 are shown in FIG. 5 as being substantially round, this is simply a non-limiting example. Film cooling holes 86 may be any shaped hole that enables film cooling holes 86 to function as described herein.

Figure 8:
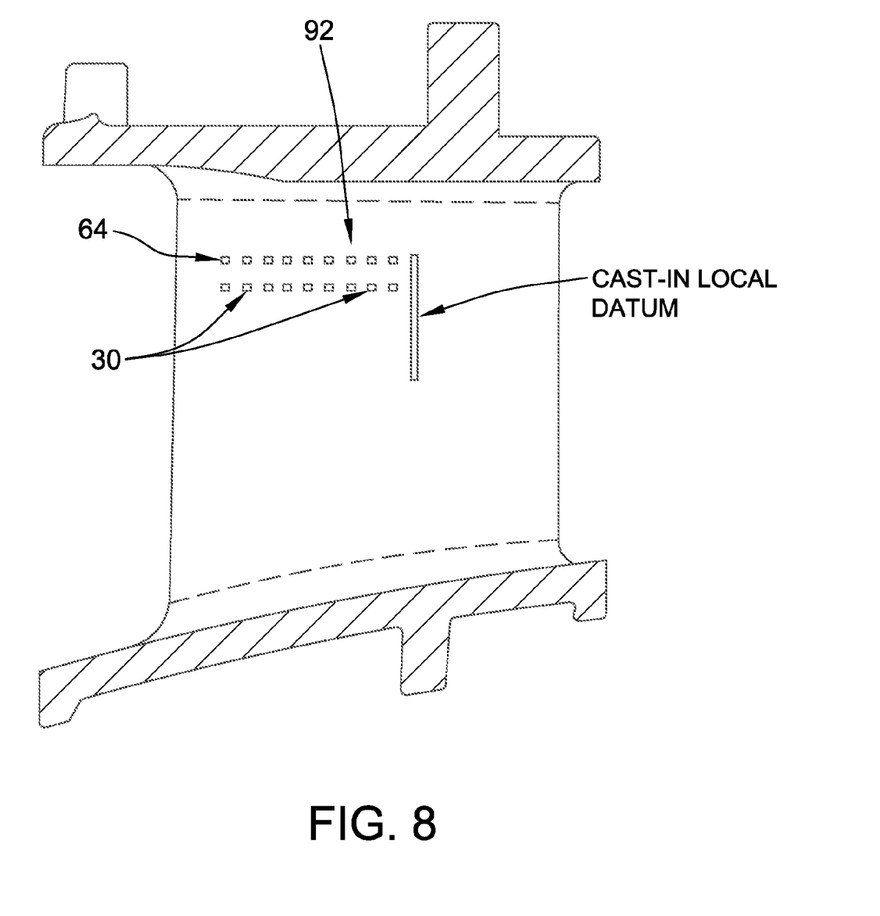
FIG. 8 is a schematic side view of the hot gas component 28 of FIG. 3, illustrating cast-in reference datums and recessed component features.

FIG. 8 is a schematic side view of hot gas component 28 of FIG. 3, illustrating integrally formed or cast-in datums or component features 92. In the exemplary embodiment, hot gas path component 28 includes one or more cast-in features 92 (some of which may not be shown and/or labeled with reference numeral 92). Cast-in features 92 include, for example, reference datums to facilitate improved manufacturability in the post-processing of hot gas path component 28, including inlet passage 64 and micro-channel 30 locations or markers to assist in placing these features by other manufacturing methods (e.g., milling, EDM, etc.). In addition, cast-in features 92 include recessed component features, such as the partial creation of inlet passages 64 and micro-channels 30, and one or more turbulator features that facilitate turbulent through micro-channels 30. As described and illustrated herein, cast-in features 92 are exemplary only. As such, and despite how cast-in features 92 are illustrated, hot gas path component 28 may include any number of cast-in features that are each positioned anywhere on hot gas path component 28 that enable hot gas path component 28 to function as described herein.

The systems and methods described herein facilitate cooling of a hot gas path component 28 at a high heat transfer rate and with a relatively uniform temperature profile by providing cast-in features for near wall cooling. The cast-in features facilitate the fabrication of a braze micro-channel cooling system 42, by providing cast-in recessed pockets, partially formed micro-channels, and various datums and flow modifying features. Casting these features into the substrate of the hot gas path component facilitates reducing the cost of manufacturing while providing a high performance cooling system that facilitates increasing the life of hot gas path component 28 and enabling hot gas path component 28 to be utilized with higher temperature hot gas flows 22, thus increasing the performance and efficiency of gas turbine engine 10.

The apparatus and systems described herein are not limited to the specific embodiments described herein. For example, components of each apparatus and system may be utilized independently and separately from other components described herein. For example, the apparatus and systems may also be used in combination with other turbine systems, and are not limited to practice only with the gas turbine engines as described herein. Rather, the exemplary embodiment can be implemented and utilized in connection with many other applications.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the systems described herein, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

While the disclosure has been described in terms of various specific embodiments, those skilled in the art will recognize that the disclosure can be practiced with modification within the spirit and scope of the claims.

What is claimed is:

1. A hot gas path component comprising:
   an integrally formed, unitarily cast portion comprising a substrate, said substrate comprising an outer surface, an inner surface, and a thickness therebetween, said inner surface defining at least one interior space, said integrally formed, unitarily cast portion defining a cast-in recess having a first depth relative to said outer surface, said cast-in recess comprising a bottom surface;
   a groove machined into said bottom surface of said cast-in recess, said groove having a second depth relative to said outer surface, the second depth is less than the thickness of said substrate; and
   a cover disposed within said recess and covering at least a portion of said groove,
   wherein said groove is configured to channel a cooling fluid therethrough to cool said cover.

2. The hot gas path component in accordance with claim 1, further comprising an inlet passage machined into said substrate, said inlet passage extending from said groove to said at least one interior space, wherein said inlet passage is configured to channel the cooling fluid to said groove and provide convection cooling to said cover and said substrate.

3. The hot gas path component in accordance with claim 1, wherein the first depth of said cast-in recess is a uniform depth relative to and conforming to said outer surface of said substrate.

4. The hot gas path component in accordance with claim 3, wherein the first depth of said cast-in recess is substantially equal to a thickness of said cover.

5. The hot gas path component in accordance with claim 1, wherein said substrate further comprises an airfoil extending between a first platform and a second platform.

6. The hot gas path component in accordance with claim 5, wherein said substrate further comprises a cast in fillet formed at the intersection of said airfoil and respective said first and second platforms.

7. The hot gas path component in accordance with claim 1, wherein said integrally formed, unitarily cast portion further comprises at least one cast-in reference datum defined in said outer surface of said substrate, said groove is machined in spaced relationship to said at least one cast-in reference datum.

8. A hot gas path component comprising:
an integrally formed, unitarily cast portion comprising a substrate, said substrate comprising an outer surface and an inner surface, said inner surface defining at least one interior space, said integrally formed, unitarily cast portion defining a cast-in reference datum;
a plurality of grooves machined into a recess defined in said outer surface of said substrate, each of said grooves in spaced relationship to said cast-in reference datum; and
a cover disposed over at least a portion of said groove, wherein said grooves are configured to channel a cooling fluid therethrough to cool said cover.

9. The hot gas path component in accordance with claim 8, further comprising an inlet passage extending from said grooves to said interior space, wherein said inlet passage is configured to channel the cooling fluid to said grooves and provide convection cooling to said cover.

10. The hot gas path component in accordance with claim 8, wherein said integrally formed, unitarily cast portion further comprises said recess defined in said outer surface of said substrate.

11. The hot gas path component in accordance with claim 8, wherein said recess comprises a bottom surface, said grooves extending at least partially along said bottom surface of said recess.

12. The hot gas path component in accordance with claim 8, wherein said cover is disposed within said recess covering at least a portion of said grooves.

13. The hot gas path component in accordance with claim 8, wherein a depth of said recess is a uniform depth relative to and conforming to said outer surface of said substrate.

14. The hot gas path component in accordance with claim 13, wherein the depth of said recess is substantially equal to a thickness of said cover.

15. The hot gas path component in accordance with claim 8, wherein said integrally formed, unitarily cast portion further comprises a first platform, an airfoil, and an opposing second platform integrally joined longitudinally together, and at least one cast in fillet formed at an intersection between said airfoil and at least one of said first platform and said second platform.

16. A gas turbine engine comprising:
a compressor;
a turbine coupled to said compressor; and
a hot gas path component disposed in a least one of said compressor and said turbine, said hot gas path component comprising:
an integrally formed, unitarily cast portion comprising a substrate, said substrate comprising an outer surface and an inner surface, said inner surface defining at least one interior space, said integrally formed, unitarily cast portion defining a cast-in recess, said cast-in recess comprising a bottom surface having a first width;
a plurality of grooves machined into said bottom surface of said cast-in recess, each of said grooves comprising a second width less than the first width; and
a cover disposed over at least a portion of said groove, wherein said groove is configured to channel a cooling fluid therethrough to cool said cover.

17. The gas turbine engine in accordance with claim 16, wherein said hot gas path component further comprises an inlet passage machined into said substrate, said inlet passage extending from said grooves to said at least one interior space, wherein said inlet passage is configured to channel the cooling fluid to said grooves and provide convection cooling to said cover.

18. The gas turbine engine in accordance with claim 16, wherein said integrally formed, unitarily cast portion further comprises a cast-in reference datum defined in said outer surface of said substrate, said grooves are machined in spaced relationship to said cast-in reference datum.

19. The gas turbine engine in accordance with claim 16, wherein said integrally formed, unitarily cast portion further comprises a first platform, an airfoil, and an opposing second platform integrally joined longitudinally together, and at least one cast in fillet formed at an intersection between said airfoil and at least one of said first platform and said second platform.

20. The gas turbine engine in accordance with claim 16, wherein said cover is disposed within said recess covering at least a portion of said grooves.

* * * * *